March 16, 1965     HIDEO YASUI     3,173,713
SCREW TAPERED SOCKET JOINT FOR FISHING RODS
Filed Oct. 18, 1961     2 Sheets-Sheet 1
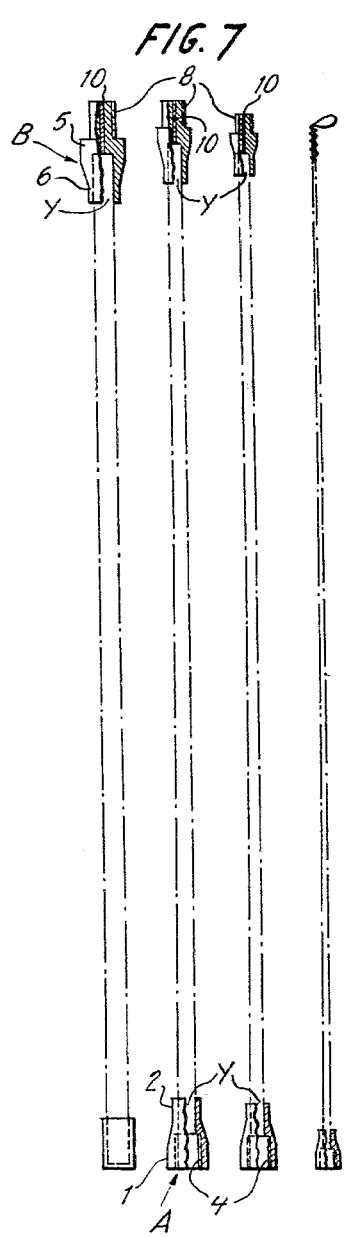
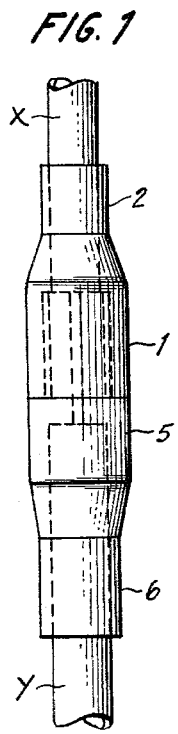
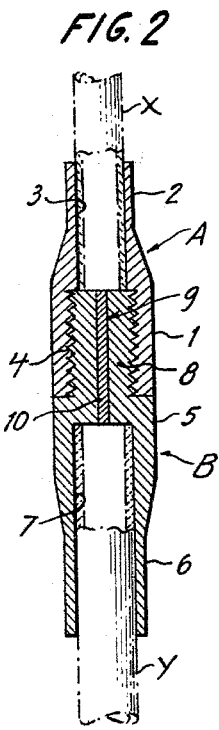
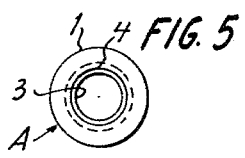
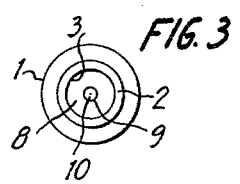
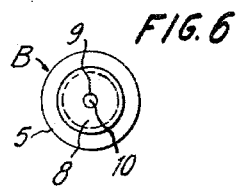
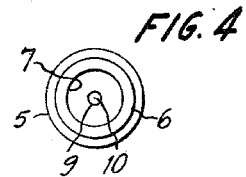
INVENTOR.
HIDEO YASUI
BY
Bierman + Bierman
ATTORNEYS March 16, 1965 HIDEO YASUI 3,173,713
SCREW TAPERED SOCKET JOINT FOR FISHING RODS
Filed Oct. 18, 1961 2 Sheets-Sheet 2
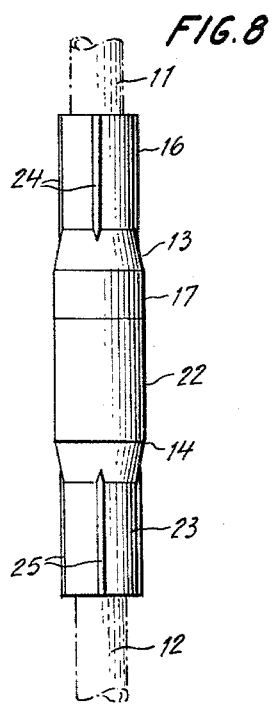
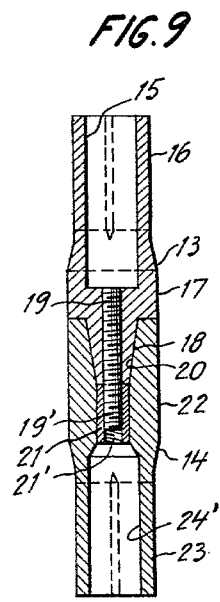
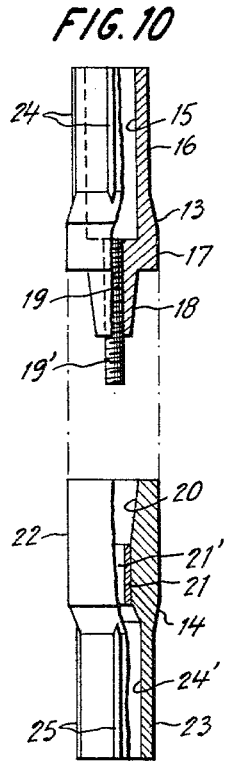
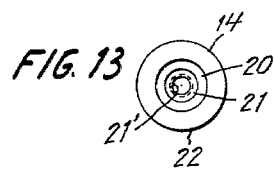
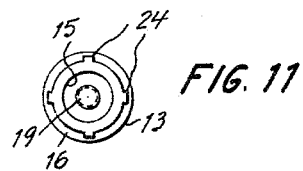
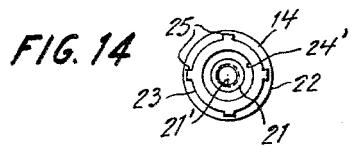
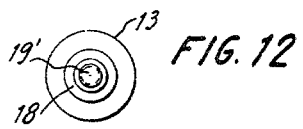
INVENTOR.
HIDEO YASUI
BY
Bierman + Bierman
ATTORNEYS

# United States Patent Office 3,173,713
Patented Mar. 16, 1965

3,173,713
SCREW TAPERED SOCKET JOINT FOR
FISHING RODS
Hideo Yasui, Bungotakada-shi, Ohita-ken, Japan, assignor
to Daimarukogyokaisha Ltd., Minami-ku, Osaka, Japan,
a corporation of Japan
Filed Oct. 18, 1961, Ser. No. 145,800
Claims priority, application Japan, Oct. 25, 1960,
35/53,677; July 21, 1961, 36/37,401
2 Claims. (Cl. 287—125)

The invention comprises a two-section hollow sleeve usually of non-metallic material, having the ends thereof of lesser diameter than the body. A male projection on one section fits into the female element in the other section. A bore in said projection has a metal rod fitted thereinto. The internal diameters of said ends are adapted to frictionally engage the ends of rods, preferably of bamboo or the equivalent material. One or more longitudinal grooves may be provided in said ends for the better frictional engagement of the rods. The male member has a central bore into which a metal rod or bar is held by friction or by threads. The male and female elements may be correspondingly tapered or may be partly tapered and partly cylindrical.

BRIEF DESCRIPTION OF THE ACCOMPANYING DRAWINGS

FIGURES 1–6 show examples of application of the present invention, concerning the composition as shown in scope 1 of patent claims.

FIGURE 1 is a frontal view of the joints, covered in the present invention, fixed with the jointed fishing rod; FIGURE 2, a cross section of the same; FIGURE 3, a frontal view of how the male and female joints are screwed together; FIGURE 4, a view of the base of the same; FIGURE 5, the base view of the female joint; FIGURE 6, a plane view of the male joint; and FIGURE 7, a longitudinal section of half of the joints, in the front view of the jointed rod fixed with the joints of the present invention.

FIGURES 8–14 pertain to examples of application of the present invention, concerning the composition shown in scope 2 of patent claims.

FIGURE 8 shows a frontal view of how the rod of the jointed rod for fishing is fixed; FIGURE 9, a longitudinal section of the central line of FIGURE 8; FIGURE 10, a semi-longitudinal section front view, with both male and female joints dismounted; FIGURE 11, a plane view of the upper male cylinder of the joints covered in the present invention; FIGURE 12 a base view of the same; FIGURE 13 a plane view of the lower female cylinder of the joints covered in the present invention; and FIGURE 14 a base view of the same.

DETAILED DESCRIPTION OF THE INVENTION

The joints covered in the present invention are intended for rendering it possible to have bamboo, a natural product, the size of which may not be predetermined, easily fixed on the joints of two or three different calibers, enhance the strength of the jointed rod, to provide it with proper bending force corresponding to the bending of the jointed rod, obtain a jointed rod equipped with a flexibility comparable with that of an unjointed rod, and enhance the strength at the part where the male and female joints are screwed together.

Examples of actual application of the present joints will be described, per accompanying drawings, as follows.

No. 1.—Composition of scope 1 of patent claims

A and B show female and male joints, respectively. Female joint A consists of larger outer diameter part 1 and smaller outer diameter part 2. Female screw 4 is provided through the insertion hole 3 of the rod X, extending over 1 and 2, and, adjacent to the said hole 3. Male joint B is provided, in its larger outer daimeter part 5 and smaller outer diameter part 6, with an insertion hole 7 of the rod Y, extending over 6 and 5. The larger outer diameter part 5 is provided with the male screw 8, while a small hole 9, leading to the said hole 7, is provided in the said male screw section 8. The said small hole 9 is provided with a metal core 10, so that the male screw section 8 is screwed in the female screw section 4.

In executing the present invention, constructed as described above, the rod X is inserted into the female joint A and the rod Y into the male joint B.

As both rods X and Y are inserted up to the larger outer diameter parts 1 and 5 from the smaller diameter parts 2 and 6 of the joints A and B, the root section of the rods X and Y may be prevented from being broken, aided by the thickness carried by the larger diameter parts 1 or 5. As, furthermore, the male screw section 8, which is to be screwed in the female screw section 4, is provided with a metal core 10, no breakage will be liable to be caused in the neighborhood of the core 10, and, consequently, the screw sections 4 and 8 will carry no likelihood of being injured.

The joints, designed as described above, fully utilize the special properties of polycarbonate resin, so that their fixation to the rod end, or, the insertion root, be rendered easier. In spite of limitless variations in the diameter of bamboo, there will be no need of preparing joints of numerous different kinds, but merely 2 or 3 kinds of joints are found enough for application on bamboo rods of all possible diameters. The male and female joints so consist of larger and smaller diameter parts that they may be enabled to effectively stand bending, with the male and female linked parts sufficiently strengthened.

It is reminded that, in fixing the end of a bamboo rod, it is fixed as strongly in conformity with the shape of the cut section of bamboo, as possible, taking advantage of the bamboo's special property of flexibility and its tensile strength.

Also, the root, inserted, is prevented from shrinking, resulting in the slackening of the fixture, which is liable to come from the age of the bamboo and its dryness due to the exposure to the air, by utilizing the elasticity and elongation, peculiar to bamboo.

In the case of the metal joints, as employed in the well-known conventional examples, they, when they are to be fixed on a bamboo rod, are liable to give undue pressure to the bamboo material, resulting in its deformation, or, to render the caliber small by planing, and, as the bamboo is affected by aging and exposure to the air, fixture is only too liable to slacken, often leading to the joints coming out inadvertently.

Also, with such joints, it would be imperatively necessary that numerous kinds of joints be prepared beforehand to fit into bamboo materials of all possible calibers, this being because these joints are not provided either with elasticity or elongation. They, also, have the drawback of having to be fixed with adhesives. These drawbacks as well as shortcomings are completely eliminated in the case of the joints covered in the present invention.

These joints are so designed that, as they are strongly pressed by the bending by the bamboo's root, the inserted portion of the root is made to consist of a thick and a thin part, while the inserted end is properly protected by the thick part.

Moreover, the thin part will be allowed to retain its strength as the bamboo rod is inserted, providing the jointed rod with the same hardness or softness of bending as in the case of an unjointed rod.

Because, generally, the Young's modulus of bamboo is bigger than that of polycarbonate resin, the size of the outer diameter of the jointed part may be determined on condition that the overall harmony with the bending be preserved even in case the outer diameter of the jointed part of the joint is slightly bigger than the size of bamboo.

In case the jointed rod, with the joints covered in the present invention being screwed thereon, is subjected to bending, the distribution of stress affecting the male screw is based at the root of the male screw, which is compared with the case of cantilever where the equally distributed load affects the entire length of the screw.

Accordingly, the maximum flexible stress is located at the root of the male screw, which means the shortest distance to the fulcrum. Thus, damage to the male screw will be avoided by rounding the root of the male screw at the jointed portion, by fixing the male screw slightly above the root of the jointed part, and providing the female screw at a point corresponding thereto, so that the initial hollow of the screw is released from the position of the maximum stress, and, thus, by protecting the male screw from the notching effect from its root and hollow and, at the same time, by inserting the core bar, made of hard material, into the center of the jointed part.

This core bar, intended for reinforcement, may be variously constructed and fixed, it being possible to have it inserted and fixed by being simply forced into a perforation, have it incorporated simultaneously with the molding of the unit, have it retained in a shape of bar or cylinder, have it provided with a flange on both ends, or have its ends screwed.

Either of these formulae may be executed easily, so far as its technical aspect is concerned, in the application of the present invention.

*No. 2.—Composition of scope 2 of patent claims*

The present joints relate to those of a jointed rod for fishing, made of polycarbonate or similar material, in which are provided male and female bodies 13 and 14, to which upper and lower rods 11 and 12 are fixed, the larger diameter part 17 is provided below the small-diameter cylindrical part 16, which is provided with a vertical perforation 15 for inserting the upper rod 11, while, below the said part 17, the conical part 18, whose diameter tapers downward, is provided; and, a screw bar 19, made of brass, etc., is implanted extending over the larger-diameter part 17 and the conical part 18, below which the lower end 19 of the screw bar 19 comes out, while a bowl-shaped perforation 20, coinciding with the said conical part 18 is provided on the female body 14, with a metallic female screw cylinder 21, equipper with a perforation 21 piercing through the lower end 19 of the core bar 19 being inlaid on the larger-diameter part 22, and furthermore, with a vertical perforation 24 for fixing the lower rod 12 being provided on the lower small-diameter cylindrical part 23.

The lower end of the screw bar 19 of the male and female bodies 13 and 14, thus constructed, is screwed into the hole 21' on the metallic female screw cylinder 21, so that the conical part 18 may fit into the bowl-shaped hole 20, while, on both male and female bodies, bulging lines (in plural number) 24 and 25, leading to each large-diameter parts 17 and 22 are provided along the outer peripheries of the small-diameter cylindrical parts 16 and 23.

These joints, because they are constructed as described above, and, because of the fact, moreover, that their body is made of polycarbonate or similar material, and that the male body 13 is provided with a conical part 18 which fits into the bowl-shaped hole 20 on the female body 14, completely eliminate the likelihood of inadequate fixture or slackening consequent upon deformation after resin is molded, and, instead, are capable of effecting a perfect cohesion of the male and female bodies.

At the same time, because a screw bar 19 is planted through the large-diameter part 17 and the conical part 18, the resin material is firmly buried in the screw part of the said screw bar 19 so that the screw bar 19 may not easily come out, while its lower end 21' bulges out in such a way that it fits into the screw hole 21' on the metallic female screw cylinder 21 of the female body 14, with the result that, unlike the case when it is fixed into the screw part curved on the resin, it will never cause the wear of the screw threads, leading to its coming out. This, combined with the perfect cohesion, as described above, of the conical part 18 and the bowl-shaped hole 20' enables the male and female bodies to be perfectly fixed together.

Moreover, the male and female inserted portions, which are liable to be subjected to the concentrated stress in the outermost bending, consist of the large-diameter parts 22 and 17, and, therefore, the joints will never be liable to be injured by the inserted parts, while, because the small-diameter cylindrical parts 16 and 23 are provided, radially and at mutually equal intervals, with the bulges 24, each leading to the large-diameter parts 17 and 22, the work of inserting the joints into the rod may be undertaken with a higher efficiency, eliminating unnecessary sliding or gliding operation, while the resistance of the joints against bending may, at the same time, be greatly enhanced.

In executing the present invention, it is also possible, technically, to keep the bulging lines 24 and 25 on the same height with the diameter of the large-diameter parts 17 and 22.

With the construction and effect of the present invention being such as is described in the foregoing lines, it is amply efficacious for obtaining a jointed rod of equal working quality to an unjointed rod.

What is claimed is:

1. A joint for fitting rods together end-to-end comprising a hollow female body having substantially flat ends, a cylindrical bore for reception of a rod at one of said ends, a cylindrical bore of smaller diameter constituting a continuation of said bore, the outer end of said smaller bore tapering outwardly from said smaller diameter to the other end of said body and terminating at said other flat end, an internally threaded sleeve fixed in said smaller diameter, a substantially cylindrical male body having at one end a tapered extension complementary to said tapered bore of said female body and terminating adjacent to said sleeve, a flat shoulder at the wide end of said tapered extension in contact with said other end of said female body, a cylindrical bore at the end of said male body opposite said extension, an externally threaded bar fixed in said male extension and protruding beyond the narrower end thereof, said protruding part being threaded into said sleeve.

2. A joint according to claim 1 characterized in that the outer diameter of the assembled bodies opposite said threaded bar is greater than the diameter of said rod reception bores.

(References on following page)

References Cited by the Examiner

UNITED STATES PATENTS

| | | | |
|---|---|---|---|
| 101,913 | 4/70 | Rand | 287—119 |
| 169,181 | 10/75 | Leonard | 43—18 |
| 171,680 | 1/76 | McNair | 287—125 |
| 250,842 | 12/81 | Rippard | 43—18 |
| 330,005 | 11/85 | Donaghy | 287—125 |
| 1,438,391 | 12/22 | Nutter | 287—125 |
| 1,565,069 | 12/25 | Edwards | 287—125 |
| 1,706,973 | 3/29 | Zagorski | 287—76 |
| 1,849,510 | 3/32 | Thomson | 287—125 |
| 2,446,406 | 8/48 | Beyerle | 287—108 |
| 2,644,475 | 7/53 | Morton | 287—126 |

FOREIGN PATENTS 1,806    1876    Great Britain.

CARL W. TOMLIN, *Primary Examiner*.

WALTER A. SCHEEL, THOMAS F. CALLAGHAN,
*Examiners*.